United States Patent
Yamanaka

(10) Patent No.: US 9,319,144 B2
(45) Date of Patent: Apr. 19, 2016

(54) OPTICAL TRANSMITTER AND METHOD OF CONTROLLING OPTICAL TRANSMITTER

(71) Applicant: SUMITOMO ELECTRIC INDUSTRIES, LTD., Osaka-shi, Osaka (JP)

(72) Inventor: Shingo Yamanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/302,066

(22) Filed: Jun. 11, 2014

(65) Prior Publication Data

US 2014/0363175 A1    Dec. 11, 2014

(30) Foreign Application Priority Data

Jun. 11, 2013    (JP) ................................. 2013-123005

(51) Int. Cl.
    *H04B 10/04*    (2006.01)
    *H04B 10/50*    (2013.01)

(52) U.S. Cl.
    CPC ...... *H04B 10/5053* (2013.01); *H04B 10/50572* (2013.01); *H04B 10/50575* (2013.01)

(58) Field of Classification Search
    CPC .... H04B 10/516; H04B 10/54; H04B 10/548; H04B 10/505; H04B 10/5055; H04B 10/5057; H04B 10/50572; H04B 10/50575; H04B 10/50577; H04B 10/564; H04B 10/572; H04B 10/50593; H04B 10/50595; H04B 10/50597

USPC ......... 398/183, 184, 185, 196, 187, 188, 192, 398/193, 194, 195, 197, 198, 200, 201, 158, 398/159, 33, 199, 38, 135, 136, 137; 359/237, 238, 239, 245, 248

See application file for complete search history.

(56) References Cited

U.S. PATENT DOCUMENTS

| 7,184,671 | B2 * | 2/2007 | Wang ............................ 398/195 |
| 2010/0080571 | A1 * | 4/2010 | Akiyama et al. ............. 398/184 |
| 2011/0026935 | A1 * | 2/2011 | Akiyama et al. ............. 398/184 |

FOREIGN PATENT DOCUMENTS

JP    2010-204689    9/2010

OTHER PUBLICATIONS

Optical Internetworking Forum, "*Multisource Agreement for 100G Long-Haul DWDM Transmission Module—Electromechanical*", Jun. 8, 2010.
Optical Internetworking Forum, "*Implentation Agreement for Integrated Polarization Multiplexed Quadrature Modulated Transmitters*", Mar. 12, 2010.

* cited by examiner

*Primary Examiner* — Hanh Phan
(74) *Attorney, Agent, or Firm* — Smith, Gambrell & Russell, LLP.

(57) ABSTRACT

An optical transmitter includes a light source configured to generate direct current light; a multi-value modulator configured to modulate the direct current light; an optical switch configured to block output light of the multi-value modulator; a driving circuit configured to output a driving signal for driving the multi-value modulator; a bias control circuit configured to control a bias voltage applied to the multi-value modulator, according to an optical output power of the multi-value modulator; and a control circuit configured to control operations of the optical switch, the driving circuit and the bias control circuit, wherein the control circuit decreases an amplitude of the driving signal output from the driving circuit while synchronizing with the blocking of the output light of the multi-value modulator by the optical switch.

6 Claims, 16 Drawing Sheets

OPTICAL TRANSMITTER AND METHOD OF CONTROLLING OPTICAL TRANSMITTER

TECHNICAL FIELD

The present invention relates to an optical transmitter and a method of controlling the optical transmitter.

BACKGROUND

A transmission system in which multi-level modulation using optical phase information is applied has been used in order to handle a recent rapid increase in communication link capacity. As a receiving system of the transmission system in which the multi-level modulation is applied, there is a digital coherent signal system in which a signal is received through a digital signal processing of a coherent signal detected by using interference between signal light and local oscillation light.

A Dual Polarization Quadrature Phase Shift Keying (DP-QPSK) system in which multiplexing is performed by assigning two phase signals to each of two lights having different polarizations each other is currently used for multi-level modulation. Using the transmission system in which the DP-QPSK system is applied, it is achieved to transmit a signal with a transmission capacity of 100 Gbps per one wavelength. A transceiver using such a transmission system has been specified as disclosed in Non Patent Literature 1 ("Multi-source Agreement for 100G Long-Haul DWDM Transmission Module—Electromechanical", Optical Internetworking Forum, Jun. 8, 2010) and Non Patent Literature 2 ("Implementation Agreement for Integrated Polarization Multi-plexed Quadrature Modulated Transmitters", Optical Internetworking Forum, Mar. 12, 2010).

In a typical transceiver specified in Non Patent Literatures 1 and 2, a CW light output from a transmission side light source is modulated with a transmission side electric signal using a multi-level modulator, and the modulated optical signal is transmitted to the outside as transmission light. At the same time, in such a transceiver, a light received from the outside and a local oscillation light output from a local oscillation light source are interfered using an interferometer and the interfered light is converted into a receiving side electric signal, with a photo diode. Herein, with the transceiver, in order to achieve further down-sizing and to reduce power consumption, a configuration in which the transmission side light source and the local oscillation light source are unified as one light source is considered. Such a configuration is an effective way of reducing power consumption and an installation size by unification of two wavelength controlling circuits, which were separated for transmission and receiving sides, respectively.

For example, a semiconductor Mach-Zehnder modulator is used as the multi-level modulator. The Mach-Zehnder modulator has a configuration in which one optical waveguide branches off to two optical waveguides, at an input side thereof, and the two branching optical waveguides are joined into one optical waveguide, at an output side thereof. An electrode is formed on each of the two branching optical waveguides. A bias voltage is applied to the electrodes by a bias control circuit, and a pair of complimentary voltage signals, which phase are opposite to each other, is also applied to the electrodes as a modulation signal by a driving circuit.

The bias voltage is set such that a phase difference between two lights passing through the two optical waveguide of the Mach-Zehnder modulator respectively is equal to $\pi$. In more detail, when the modulation signal is not input, the bias voltage is set such that a phase of light passing through one optical waveguide becomes $3\pi/2$ and a phase of light passing through the other optical waveguide becomes $\pi/2$.

In a state in which the bias voltage is set in this way, when the modulation signal is input as a pair of complementary voltage signals, the phase of the light passing through the one optical waveguide is changed from $2\pi$ to $\pi$ as is $3\pi/2+x$ (herein, $-\pi/2 \leq x \leq \pi/2$), and the phase of the light passing through the other optical waveguide is changed from 0 to $\pi$ as is $\pi/2-x$.

Further, a photo diode is put in at the output side of the Mach-Zehnder modulator. The photo diode receives a part of the transmission light branching from the Mach-Zehnder modulator as a monitoring light and detects an optical power of the transmission light. A bias control circuit controls the bias voltage to optimally maintain an operation point of the Mach-Zehnder modulator depending on the optical power detected by the photo diode.

Further, Japanese Patent Laid-Open Publication No. 2010-204689 has been known as a literature in which a technology relating to the corresponding technical field is disclosed.

SUMMARY

However, in Non Patent Literature 1, a transceiver is required to have a transmitter disable function for shutting off a transmission light according to an instruction of a host device. When one light source is used in common both for transmission and receiving sides, a dilemma of shutting off the output of the light source to perform the transmission disable function or simultaneously keeping the output of the light source not to stop the receiving side, however, arises. Thus, it is considered that a Variable Optical Attenuator (VOA) is equipped as an apparatus for blocking a light at an output side of a Mach-Zehnder modulator, and the transmission light is shut off by the VOA at the time of performing the transmitter disable function.

However, when the VOA is used, a power consumption of the transceiver increases by an amount of electric power consumed for controlling the VOA. In order to compensate for the increase in the power consumption, it is considered that an operation of a driving circuit for driving a multi-level modulator is suspended at the time of performing the transmitter disable function. However, when the operation of the driving circuit is suspended, a problem occurs as described below.

When the operation of the driving circuit is suspended at the time of performing the transmitter disable function, the output from the output side of the Mach-Zehnder modulator corresponds to light obtained by merging a light having a phase of $3\pi/2$ passing through one optical waveguide and a light having a phase of $\pi/2$ passing through the other optical waveguide. Thus, in this case, the transmission light is not output from the Mach-Zehnder modulator since the two lights passing through the two respective optical waveguides cancel each other.

In this way, when the transmission light from the output side of the Mach-Zehnder modulator is optically quenched by stopping the operation of the driving circuit, the monitoring light to the photo diode is also optically quenched. Accordingly, a bias control circuit cannot monitor a state of the modulator, especially, a phase difference between the two lights passing through the two respective optical waveguides. Therefore, an operation point of the Mach-Zehnder modulator drifts during a transmitter disable state, and immediately after the transmitter disable state is released, an optical signal transmitted from the transceiver temporarily deteriorates.

In order to avoid such deterioration of the optical signal, it can be considered that the drifting of the operation point of the Mach-Zehnder modulator is compensated for by performing starting-up of the driving circuit and calibration of the bias control circuit until the VOA stops blocking the light output from the Mach-Zehnder modulator after the transmission disable state is released. However, when such a configuration is made up, there are problems in that power consumption increases while drift compensation is performed, and some time is required from starting-up until returning to a normal operation after releasing the transmitter disable state.

In accordance with an aspect of the present invention, an optical transmitter is provided. The optical transmitter includes a light source configured to generate a continuous wave light; a multi-level modulator configured to modulate the continuous wave light; an optical shutter configured to block an output light of the multi-level modulator, a driving circuit configured to output a driving signal configured to drive the multi-level modulator; a bias control circuit configured to control a bias voltage applied to the multi-level modulator, according to an optical output power of the multi-level modulator; and a control circuit configured to control the optical shutter, the driving circuit and the bias control circuit, wherein the control circuit decreases an amplitude of the driving signal output from the driving circuit while synchronizing with the blocking of the output light of the multi-level modulator by the optical shutter.

In accordance with such an optical transmitter, the amplitude of the driving signal configured to drive the multi-level modulator is decreased while synchronizing with the blocking of the optical output of the multi-level modulator by the optical shutter. Thus, a power consumption of the driving circuit decreases during the blocking operation of the optical shutter. At the same time, since light output from the multi-level modulator does not completely disappear, the bias control circuit can continuously control the bias voltage applied to the multi-level modulator in accordance with the optical output power of the multi-level modulator. Accordingly, a bias point of the multi-level modulator can be properly controlled while decreasing a power consumption of the optical transmitter.

In the aforementioned optical transmitter, it is suitable that the multi-level modulator includes one or more semiconductor Mach-Zehnder modulators, the semiconductor Mach-Zehnder modulator includes a first optical waveguide and a second optical waveguide configured to pass two beams of light branching off from an input side of the semiconductor Mach-Zehnder modulator, a first electrode installed on the first optical waveguide, and a second electrode installed on the second optical waveguide, the bias control circuit applies individual bias voltages to the first and second electrodes, respectively, and the control circuit controls the operation of the bias control circuit to adjust the bias voltages such that a phase difference between light passing through the first optical waveguide and light passing through the second optical waveguide is kept to be $\pi$ while synchronizing with the blocking of the output light of the multi-level modulator by the optical shutter. In this case, the bias voltage is adjusted such that the phase difference between the light passing through the first optical waveguide and the light passing through the second optical waveguide becomes $\pi$. At a time of a normal transmission operation of the optical transmitter, the phase difference between the light passing through the first optical waveguide and the light passing through the second optical waveguide becomes $\pi$. Accordingly, by the above configuration, the phase difference between the light passing through the first optical waveguide and the light passing through the second optical waveguide can be controlled to be a proper value when returning to a normal operation state.

Further, it is also suitable that the multi-level modulator includes the two semiconductor Mach-Zehnder modulators and the control circuit controls the bias control circuit, with respect to each of the two semiconductor Mach-Zehnder modulators, in a time sharing system, to adjust the bias voltage such that a phase difference between light passing through the first optical waveguide and light passing through the second optical waveguide becomes $\pi$. In this case, the bias voltage is adjusted with respect to the two semiconductor Mach-Zehnder modulators in a time sharing system. Accordingly, the two semiconductor Mach-Zehnder modulators can use the one bias control circuit, the one driving circuit and the one control circuit together, and the downsizing and the reduction in the power consumption of the optical transmitter can be achieved.

Further, it is also suitable that the driving circuit has a differential circuit configuration including an open collector output or an open drain output, and the driving signal is output to the multi-level modulator through current switching. In this case, since the driving circuit has the differential circuit configuration, a pair of complementary voltage signals is applied to the multi-level modulator as a driving signal, and the driving signal is output to the multi-level modulator through the current switching, so that the bias point of the driving signal can be optimized.

Further, it is also suitable that the amplitude of the driving signal output from the driving circuit is decreased by decreasing the current defined by the current source included in the differential circuit. In this case, the amplitude of the driving signal can be easily decreased by decreasing the current defined by the current source included in the differential circuit.

In accordance with an aspect of the present invention, a method of controlling an optical transmitter including a multi-level modulator, an optical shutter configured to block an output light of the multi-level modulator, a bias control circuit configured to control a bias voltage applied to the multi-level modulator according to an optical output power of the multi-level modulator is provided. The method performs a process wherein the multi-level modulator includes one or more semiconductor Mach-Zehnder modulators, the semiconductor Mach-Zehnder modulator includes a first optical waveguide and a second optical waveguide configured to pass two lights branching off from an input side of the semiconductor Mach-Zehnder modulator, a first electrode formed on the first optical waveguide, and a second electrode formed on the second optical waveguide, the bias control circuit applies individual bias voltages to the first and second electrodes, respectively, and while synchronizing with the blocking of the output light of the multi-level modulator by the optical shutter, an amplitude of a driving signal configured to drive the multi-level modulator is decreased, and the bias voltage is adjusted such that a phase difference between light passing through the first optical waveguide and light passing through the second optical waveguide becomes $\pi$.

In accordance with such a method of controlling the optical transmitter, the amplitude of the driving signal configured to drive the multi-level modulator is decreased while synchronizing with the blocking of the optical output of the multi-level modulator by the optical shutter. Thus, a power consumption of the driving circuit is decreased at a time of the blocking operation of the optical shutter. At the same time, since light output from the multi-level modulator does not completely disappear, the bias control circuit can continuously control the bias voltage applied to the multi-level modulator in accordance with the optical output power of the multi-level modulator. Accordingly, a bias point of the multi-level modulator can be properly controlled while decreasing power consumption of the optical transmitter. Further, the bias voltage is adjusted such that the phase difference between the light passing through the first optical waveguide and the light passing through the second optical waveguide becomes π. At a time of a normal transmission operation of the optical transmitter, the phase difference between the light passing through the first optical waveguide and the light passing through the second optical waveguide becomes π. Accordingly, by the above configuration, the phase difference between the light passing through the first optical waveguide and the light passing through the second optical waveguide can be controlled to be a proper value when returning to a normal operation state.

Further, in the method of controlling the optical transceiver, it is suitable that the multi-level modulator includes the two semiconductor Mach-Zehnder modulators and the bias voltage is adjusted with respect to each of the two semiconductor Mach-Zehnder modulators, in a time sharing system, such that a phase difference between light passing through the first optical waveguide and light passing through the second optical waveguide becomes π. In this case, the bias voltage is adjusted with respect to the two semiconductor Mach-Zehnder modulators in a time sharing system. Accordingly, the two semiconductor Mach-Zehnder modulators can use the one bias control circuit, the one driving circuit, the one control circuit and the control circuit configured to control the bias control or the driving circuit, together, and the downsizing and the reduction in the power consumption, of the optical transmitter, can be achieved.

DETAILED DESCRIPTION

Figure 1:
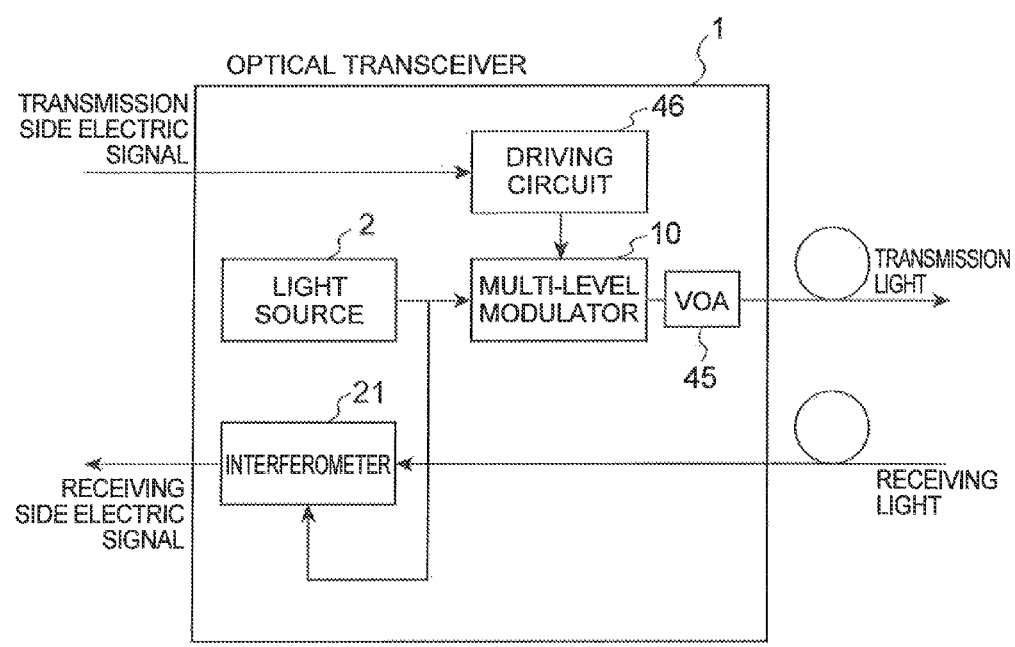
FIG. 1 is a block diagram illustrating a functional configuration of an optical transmitter according to an embodiment of the present invention.

Hereinafter, an embodiment of the present invention will be described in detail with reference to the accompanying drawings. Meanwhile, in the description of the drawings, the same element or equivalent elements will be designated by the same reference numeral and a duplicate description thereof will be omitted.

FIG. 1 is a block diagram illustrating a function configuration of an optical transceiver (optical transmitter and receiver) according to the present embodiment. As illustrated in FIG. 1, an optical transceiver 1 includes a light source 2, a multi-level modulator 10, a driving circuit 46, a Variable Optical Attenuator (VOA) 45 and an interferometer 21. The optical transceiver 1 is used in, for example, optical communication.

A configuration for transmitting a signal light by the optical transceiver 1 will be described below. The light source 2 emits a continuous wave light. The multi-level modulator 10 modulates a part of the continuous wave light from the light source 2 based on a transmission side electric signal. The driving circuit 46 outputs a driving signal for driving the multi-level modulator 10 to the multi-level modulator 10 based on the transmission side electric signal from the outside of the optical transceiver 1. The VOA 45 functions as an optical shutter for attenuating a modulated light output from the multi-level modulator 10, for example, when a transmitter disable signal is received from a host device. After passing through the VOA 45, the modulated light from the multi-level modulator 10 is output as a transmission light to the outside of the optical transceiver 1 through a transmission optical fiber connected to the optical transceiver 1.

Meanwhile, a configuration for receiving a signal light by the optical transceiver 1 will be described below. The interferometer 21 makes light, input as received light from the outside of the optical transceiver 1 through a receiving optical fiber connected to the optical transceiver 1, and a part of the continuous wave light from the light source 2, interfere with each other. A interfered light obtained by making the received light and the part of the continuous wave light interfere with each other is detected by a photo detector which is not illustrated, and is output as a reception side electric signal to the outside of the optical transceiver 1. In this way, in the optical transceiver 1, the light source 2 is used for both purposes to transmit a signal light (transmission light) to the outside and to receive a signal light from the outside.

Figure 2:
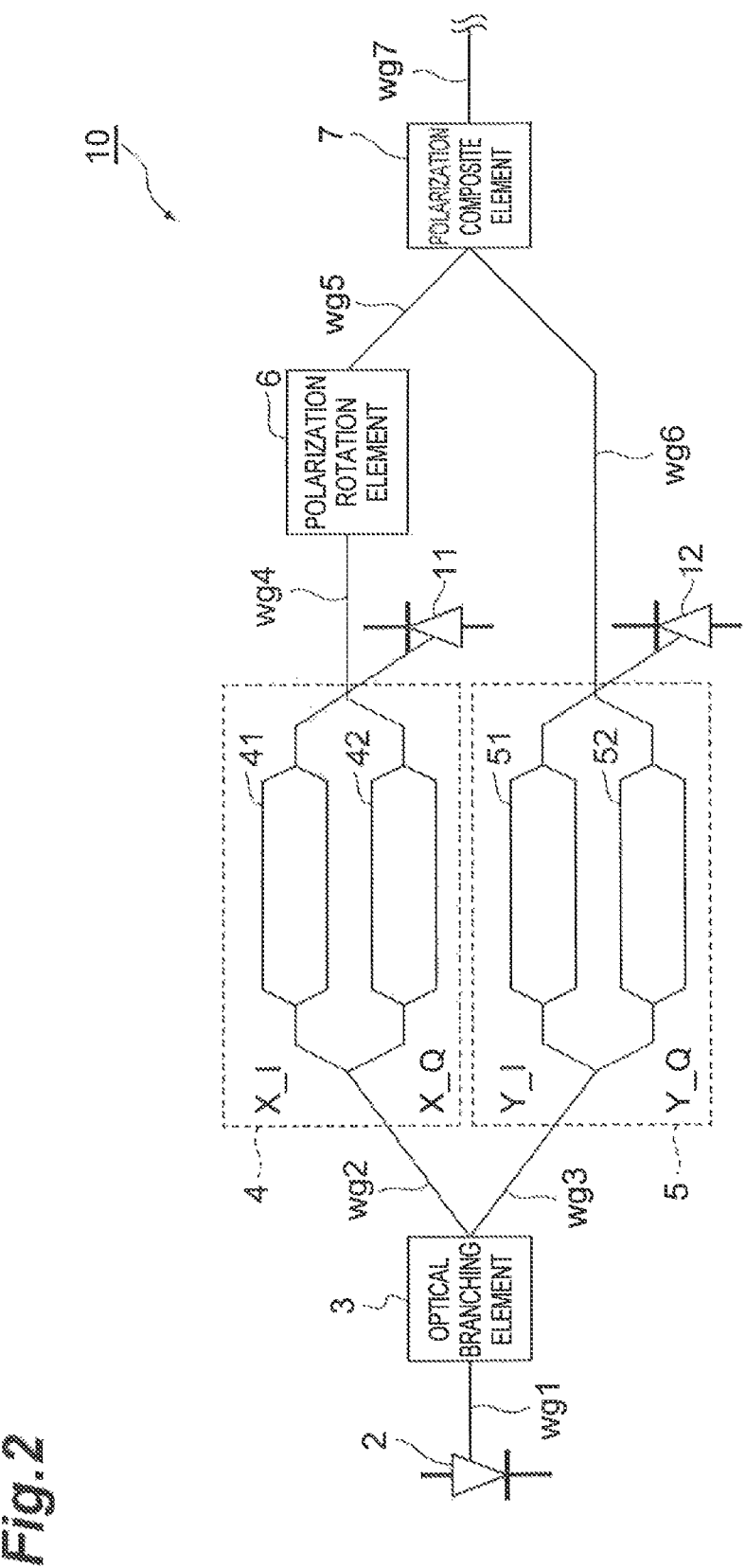
FIG. 2 schematically illustrates a configuration of a multi-level modulator according to an embodiment of the present invention.

Next, a schematic configuration of the multi-level modulator 10 will be described with reference to FIG. 2. FIG. 2 is a schematic configuration of the multi-level modulator 10. The multi-level modulator 10 corresponds to a DP-QPSK modulator for generating a modulation signal (hereinafter, referred to as an "X side modulation signal") of X polarization (first polarization) and a modulation signal (hereinafter, referred to as a "Y side modulation signal) of Y polarization (second polarization). The multi-level modulator 10 comprises an optical branching element 3, a first QPSK modulator (multi-level modulator) 4, a second QPSK modulator (multi-level modulator) 5, a polarization rotation element 6, a polarization composite element 7, a first optical power monitor (photo diode) 11 and a second optical power monitor (photo diode) 12, and modulates a continuous wave light from a laser light source 2.

The laser light source 2 corresponds to, for example, a laser diode, generates light having a predetermined frequency, and emits light to the optical branching element 3 through an optical waveguide wg1. This light corresponds to, for example, light having single-polarization. The optical branching element 3 is put in between the laser light source 2 and a couple of the first QPSK modulator 4 and the second QPSK modulator 5, and divides the light emitted from the laser light source 2 into two beams of light (X side light and Y side light) having the same power. The optical branching element 3 branches off the X side light (a part of the light) to the first QPSK modulator 4 through an optical waveguide wg2, branches off the Y side light (the other part of the light) to the second QPSK modulator 5 through an optical waveguide wg3, and outputs the branched-off beams of light.

The first QPSK modulator 4 performs QPSK modulation for the input X side light to generate an X side modulation signal. Further, the first QPSK modulator 4 outputs the X side modulation signal to the polarization rotation element 6 through an optical waveguide wg4. The second QPSK modulator 5 performs QPSK modulation for the input Y side light to generate a Y side modulation signal. Further, the second QPSK modulator 5 outputs the Y side modulation signal to the polarization composite element 7 through an optical waveguide wg6.

Figure 3:
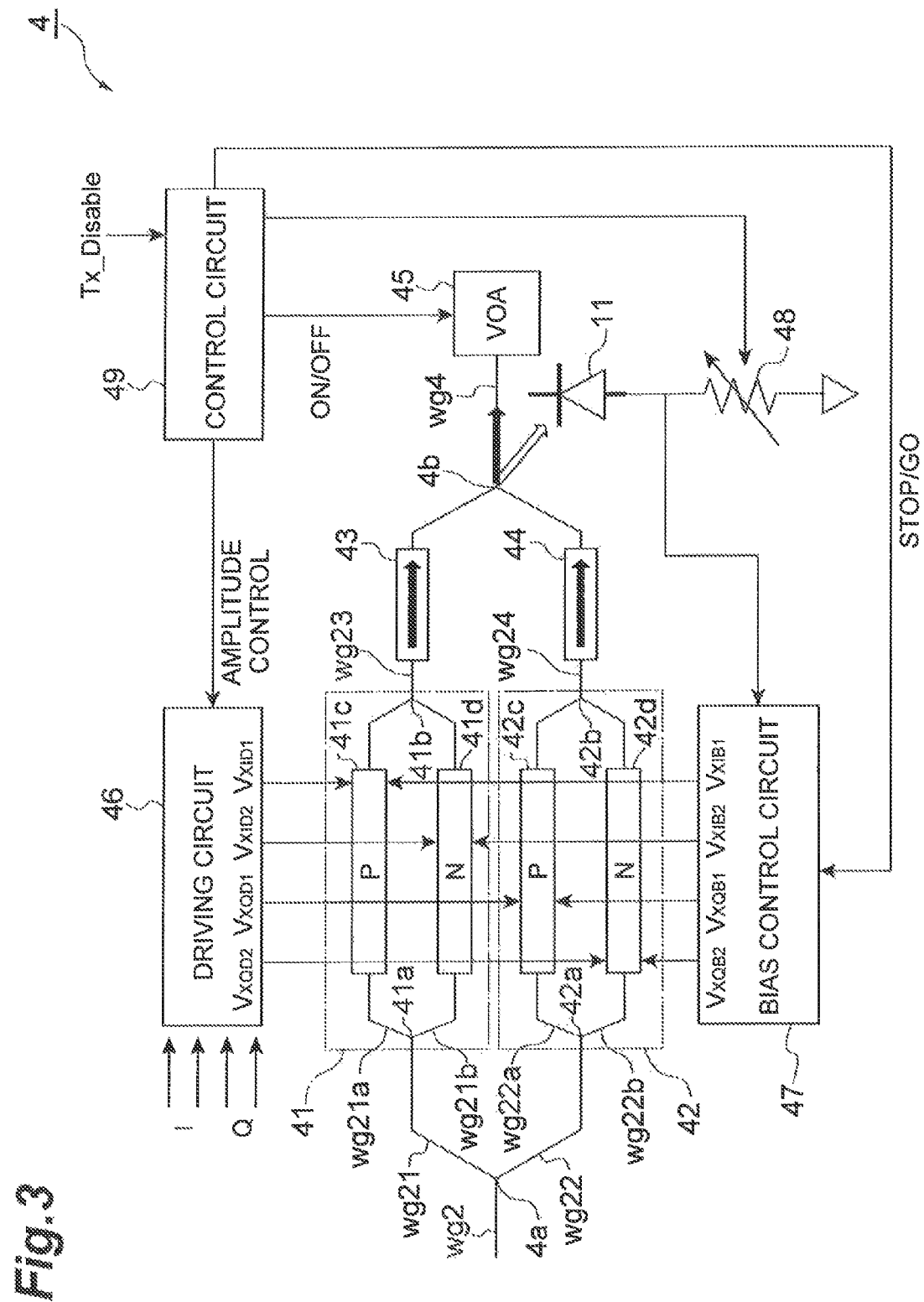
FIG. 3 illustrates a multi-level modulator and a configuration for controlling the multi-level modulator.

Here, a configuration of the first QPSK modulator 4 will be described with respect to FIG. 3. As illustrated in FIG. 3, the first QPSK modulator 4 comprises a first Mach-Zehnder interference unit (semiconductor Mach-Zehnder modulator) 41, a second Mach-Zehnder interference unit (semiconductor Mach-Zehnder modulator) 42, an electrode 43, an electrode 44, a VOA (optical shutter) 45, a driving circuit 46, a bias control circuit 47, a variable resistor element 48 and a control circuit 49.

In an input unit 4a of the first QPSK modulator 4, the optical waveguide wg2 branches off to an optical waveguide wg21 and an optical waveguide wg22. The optical waveguide wg21 extends from the input unit 4a to an input unit 41a of the first Mach-Zehnder interference unit 41, and the optical waveguide wg22 extends from the input unit 4a to an input unit 42a of the second Mach-Zehnder interference unit 42. Further, an optical waveguide wg23 extends from an output unit 41b of the first Mach-Zehnder inference unit 41 to an output unit 4b, and an optical waveguide wg24 extends from an output unit 42b of the second Mach-Zehnder interference unit 42 to the output unit 4b. The optical waveguide wg23 and the optical waveguide wg24 are joined to the optical waveguide wg4 at the output unit 4b.

The first Mach-Zehnder interference unit 41 generates an XI modulation signal by superposing a data signal $D_{XI}$ to the X side light divided by the optical branching element 3, and outputs the XI modulation signal. In the input unit 41a of the first Mach-Zehnder interference unit 41, the optical waveguide wg21 branches off to an optical waveguide (first optical waveguide) wg21a and an optical waveguide (second optical waveguide) wg21b, and each of the optical waveguide wg21a and the optical waveguide wg21b extends from the input unit 41a to the output unit 41b. Further, in the output unit 41b, the optical waveguide wg21a and the optical waveguide wg21b are joined to the optical waveguide wg23. A first XI electrode (first electrode) 41c is formed on the optical waveguide wg21a, and a second XI electrode (second electrode) 41d is formed on the optical waveguide wg21b. The first XI electrode 41c and the second XI electrode 41d are arranged to be parallel to each other. Therefore, the pair of the first XI electrode 41c and the second XI electrode 41d function as a 2×2 optical directional coupler.

In the input unit 41a, the X side light passing through the optical waveguide wg21 is output to the optical waveguide wg21a and the optical waveguide wg21b. Further, in the first XI electrode 41c, a bias voltage $V_{XIB1}$ is applied by the bias control circuit 47, and a driving voltage signal $V_{XID1}$ is applied by the driving circuit 46 at the same time. In the second XI electrode 41d, a bias voltage $V_{XIB2}$ is applied by the bias control circuit 47, and a driving voltage signal $V_{XID2}$ is applied by the driving circuit 46 at the same time. The bias control circuit 47 adjusts the bias voltage $V_{XIB1}$ and the bias voltage $V_{XIB2}$ such that a phase difference between the light passing through the optical waveguide wg21a and the light passing through the optical waveguide wg21b becomes π. The driving voltage signals $V_{XID1}$ and $V_{XID2}$ correspond to a voltage signal generated based on the data signal $D_{XI}$. The voltage amplitude of the driving signal $V_{XID1}$ is equal to the voltage amplitude of the driving voltage signal $V_{XID2}$, and the polarity of the driving voltage signal $V_{XID1}$ is different from that of the driving voltage signal $V_{XID2}$. The driving voltage signal $V_{XID1}$ is applied to the first XI electrode 41c, so that the X side light passing through the optical waveguide wg21a is modulated, and a first XI modulation signal is generated. The driving voltage signal $V_{XID2}$ is applied to the second XI electrode 41d, so that the X side light passing through the optical waveguide wg21b is modulated, and a second XI modulation signal is generated. Further, in the output unit 41b, an XI modulation signal is generated by coupling the first XI modulation signal and the second XI modulation signal, and is output to the optical waveguide wg23.

The second Mach-Zehnder interference unit 42 generates an XQ modulation signal by superposing a data signal $D_{XQ}$ to the X side light divided by the optical branching element 3, and outputs the XQ modulation signal. In the input unit 42a of the second Mach-Zehnder interference unit 42, the optical waveguide wg22 branches off to an optical waveguide (first optical waveguide) wg22a and an optical waveguide (second optical waveguide) wg22b, and each of the optical waveguide wg22a and the optical waveguide wg22b extends from the input unit 42a to the output unit 42b. Further, in the output unit 42b, the optical waveguide wg22a and the optical waveguide wg22b are joined to the optical waveguide wg24. A first XQ electrode (first electrode) 42c is formed on the optical waveguide wg22a, and a second XQ electrode (second electrode) 42d is formed on the optical waveguide wg22b. The first XQ electrode 42c and the second XQ electrode 42d are arranged to be parallel to each other. Therefore, the pair of the first XQ electrode 42c and the second XQ electrode 42d function as a 2×2 optical directional coupler.

In the input unit 42a, the X side light passing through the optical waveguide wg22 is output to the optical waveguide wg22a and the optical waveguide wg22b. Further, in the first XQ electrode 42c, a bias voltage $V_{XQB1}$ is applied by the bias control circuit 47, and a driving signal $V_{XQD1}$ is applied by the driving circuit 46 at the same time. In the second XQ electrode 42d, a bias voltage $V_{XQB2}$ is applied by the bias control circuit 47, and a driving signal $V_{XQD2}$ is applied by the driving circuit 46 at the same time. The bias control circuit 47 adjusts the bias voltages $V_{XQB1}$ and $V_{XQB2}$ such that a phase difference between the light passing through the optical waveguide wg22a and the light passing through the optical waveguide wg22b becomes π. The driving voltage signal $V_{XQD1}$ and the driving voltage signal $V_{XQD2}$ correspond to a voltage signal generated based on the data signal $D_{XQ}$. The amplitude of the driving voltage signal $V_{XQD1}$ is equal to the amplitude of the driving voltage signal $V_{XQD2}$, and the polarity of the driving voltage signal $V_{XQD1}$ is different from that of the driving voltage signal $V_{XQD2}$. The driving voltage signal $V_{XQD1}$ is applied to the first XQ electrode 42c, so that the X side light passing through the optical waveguide wg22a is modulated, and a first XQ modulation signal is generated. The driving voltage signal $V_{XQD2}$ is applied to the second XQ electrode 42d, so that the X side light passing through the optical waveguide wg22b is modulated, and a second XQ modulation signal is generated. Further, in the output unit 42b, an XQ modulation signal is generated by coupling the first XQ modulation signal and the second XQ modulation signal, and is output to the optical waveguide wg24.

A first optical power monitor 11 corresponds to a monitor which detects an optical power of the X side modulation signal output from the first QPSK modulation unit 4. The first optical power monitor 11 is placed close to the output unit 4b to optically couple the optical waveguide wg23 and the optical waveguide wg24. Accordingly, the first optical power monitor 11 monitors an optical power of the light output from the optical waveguide wg23 and the optical waveguide wg24 to the optical waveguide wg4. The first optical power monitor 11 outputs a monitor current to the variable resistor element 48 as the monitored optical power.

The VOA 45 is arranged on the optical waveguide wg4, and blocks an output light of the first QPSK modulator 4 under the control of the control circuit 49. The VOA 45 regulates an optical power of the output light according to an applied voltage.

As described above, the driving circuit 46 outputs the driving voltage signals $V_{XID1}$, $V_{XID2}$, $V_{XQD1}$ and $V_{XQD2}$ to the first XI electrode 41c, the second XI electrode 41d, the first XQ electrode 42c, and the second XQ electrode 42d, as driving signals for driving the first QPSK modulator 4, respectively.

As described above, the bias control circuit 47 outputs the bias voltages $V_{XIB1}$, $V_{XIB2}$, $V_{XQB1}$ and $V_{XQB2}$ to the first XI electrode 41c, the second XI electrode 41d, the first XQ electrode 42c, and the second XQ electrode 42d, as bias voltages provided to the first QPSK modulator 4, respectively.

One end of the variable resistor element 48 is connected to the first optical power monitor 11, and the other end of the variable resistor element 48 is grounded. A resistance of the variable resistor element 48 is varied by the control circuit 49. A potential of the one end of the variable resistor element 48 is proportional to the monitor current output from the first optical power monitor 11. The bias control circuit 47 detects the optical power monitored by the first optical power monitor 11 by detecting the potential generated in the one end of the variable resistor element 48.

The control circuit 49 controls the VOA 45, the driving circuit 46 and the bias control circuit 47. In detail, the control circuit 49 receives a Tx_Disable signal corresponding to a transmitter disable signal from a host device installed on the outside of the optical transceiver 1, for example, a personal computer, and blocks the light passing through the optical waveguide wg4 with the VOA 45 according to the Tx_Disable signal. Further, as described below, the control circuit 49 controls amplitudes of the driving voltage signals $V_{XID1}$, $V_{XID2}$, $V_{XQD1}$, and $V_{XQD2}$ output from the driving circuit 46. Further, the control circuit 49 controls potential values and timings of the bias voltages $V_{XIB1}$, $V_{XIB2}$, $V_{XQB1}$ and $V_{XQB2}$ by controlling the bias control circuit 47. Further, the control circuit 49 adjusts a resistance of the variable resistor element 48.

The second QPSK modulator 5 has a configuration approximately equal to that of the first QPSK modulator 4. That is, the second QPSK modulator 5 has a first Mach-Zehnder interference unit (semiconductor Mach-Zehnder modulator) 51 and a second Mach-Zehnder interference unit (semiconductor Mach-Zehnder modulator) 52. The first Mach-Zehnder interference unit 51 generates a YI modulation signal by superposing a data signal $D_{YI}$ to the Y side light divided by the optical branching element 3, and outputs the YI modulation signal. The second Mach-Zehnder interference unit 52 generates an YQ modulation signal by superposing a data signal $D_{YQ}$ to the Y side light divided by the optical branching element 3, and outputs the YQ modulation signal.

Figure 4:
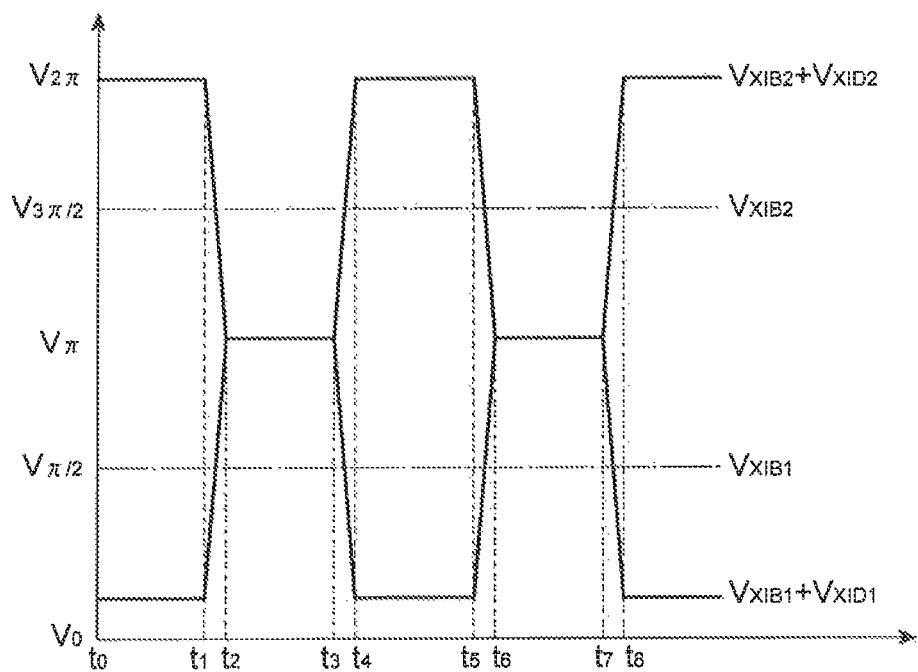
FIG. 4 is a timing chart of a bias voltage and a driving voltage which are applied to a multi-level modulator.

Here, a change in the bias voltages $V_{XIB1}$ and $V_{XIB2}$ and the driving voltage signals $V_{XID1}$ and $V_{XID2}$ during a normal operation will be described with reference to FIG. 4. FIG. 4 is a timing chart illustrating the change in the bias voltages $V_{XIB1}$ and $V_{XIB2}$ and the driving voltage signals $V_{XID1}$ and $V_{XID2}$ according to a time. A horizontal axis thereof denotes a time, and a vertical axis thereof denotes a voltage. Voltages $V_0$, $V_{\pi/2}$, $V_\pi$, $V_{3\pi/2}$ and $V_{2\pi}$ in the vertical axis correspond to the values obtained by shifting the phase of the light passing through the optical waveguide wg21a or the optical waveguide wg21b, by angles of 0, π/2, π, 3π/2 and 2π, as compared with a referenced phase.

As described above, the bias voltage $V_{XIB1}$ and the bias voltage $V_{XIB2}$ are values in which the phase difference between the light passing through the optical waveguide wg21a and the light passing through the optical waveguide wg21b becomes π. Thus, the bias voltage $V_{XIB1}$ is set to be the voltage $V_{\pi/2}$, and the bias voltage $V_{XIB2}$ is set to be the voltage $V_{3\pi/2}$.

Further, the driving voltage signals $V_{XID1}$ and $V_{XID2}$ are changed in a range from a voltage $-V_{\pi/2}$ to a voltage $V_{\pi/2}$ according to a time. As described above, the driving voltage signals $V_{XID1}$ and $V_{XID2}$ have the same absolute value but opposite polarity. Accordingly, from a time t0 to a time t1, a voltage $V_{XIB1}+V_{XID1}$ applied to the first XI electrode 41c is the voltage $V_0$ obtained by subtracting the driving voltage $V_{\pi/2}$ from the bias voltage $V_{\pi/2}$, and a voltage $V_{XIB2}+V_{XID2}$ applied to the second XI electrode 41d is the voltage $V_{2\pi}$ obtained by adding the bias voltage $V_{3\pi/2}$ to the driving voltage $V_{\pi/2}$. From a time t2 to a time t3, the voltage $V_{XIB1}+V_{XID1}$ applied to the first XI electrode 41c is the voltage Vπ obtained by adding the driving voltage $V_{\pi/2}$ to the bias voltage $V_{\pi/2}$, and the voltage $V_{XIB2}+V_{XID2}$ applied to the second XI electrode 41d is the voltage Vu obtained by subtracting the driving voltage $V_{\pi/2}$ from the bias voltage $V_{3\pi/2}$. From a time t4 to a time t5, the voltage $V_{XIB1}+V_{XID1}$ and the voltage $V_{XIB2}+V_{XID2}$ have the same voltage values from the time t0 to the time t1, and from a time t6 to a time t7, the voltage $V_{XIB1}+V_{XID1}$ and the voltage $V_{XIB2}+V_{XID2}$ have the same voltage values from the time t2 to the time t3. Thereafter, the voltage values are changed periodically.

Next, a circuit configuration of the driving circuit 46 will be described with reference to FIGS. 5 and 6. The driving circuit 46 has a differential circuit configuration including an open collector output or an open drain output.

Figure 5:
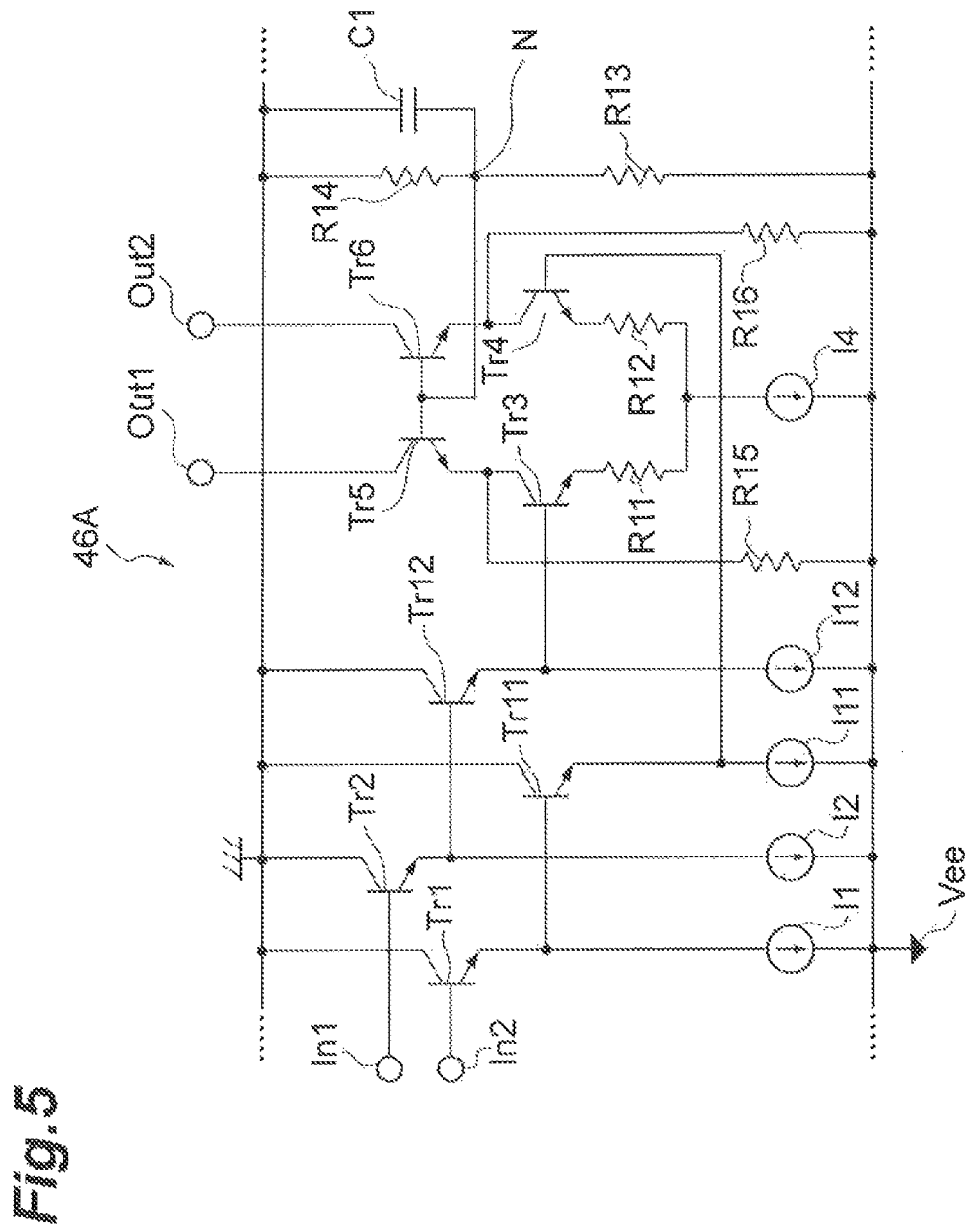
FIG. 5 is a circuit diagram illustrating an example of a driving circuit.

For example, an output port of the driving circuit 46 includes a differential amplifier 46A illustrated in FIG. 5. The differential amplifier 46A includes transistors Tr1, Tr2, Tr11, Tr12, Tr3, Tr4, Tr5 and Tr6, a capacitor C1, resistors R11, R12, R13, R14, R15 and R16, and current sources I1, I2, I11, I12 and I4. The differential amplifier 46A corresponds to a differential amplifier which amplifies a pair of complementary input signals input to input ports In1 and In2, and outputs a pair of complementary output signals from output ports Out1 and Out2.

In the differential amplifier 46A, a base of the transistor Tr1 is connected to the input port In2, a collector of the transistor Tr1 is grounded, and an emitter of the transistor Tr1 is connected to the current source I1 and a base of the transistor Tr11. Further, a base of the transistor Tr2 is connected to the input port In1, a collector of the transistor Tr2 is grounded, and an emitter of the transistor Tr2 is connected to the current source I2 and a base of the transistor Tr12. Further, a collector of the transistor Tr11 is grounded, and an emitter of the transistor Tr11 is connected to the current source I11 and a base of the transistor Tr4. Further, a collector of the transistor Tr12 is grounded, and an emitter of the transistor Tr11 is connected to the current source I12 and a base of the transistor Tr3. These transistors Tr1, Tr2, Tr11 and Tr12 configure a two-stage emitter follower circuit.

The transistor Tr3 and the transistor Tr4 configure paired differential transistors. The transistor Tr5 and the transistor Tr6 are connected to the transistor Tr3 and the transistor Tr4 in cascade, respectively. That is, the transistors Tr5 and Tr6 are a pair of cascode transistors connected to the transistors Tr3 and Tr4 in series, respectively. In more detail, a collector of the transistor Tr3 is connected to an emitter of the cascode transistor Tr5, and a collector of the transistor Tr4 is connected to an emitter of the cascode transistor Tr6. An emitter of the transistor Tr3 is connected to the current source I4 through the resistor R11, and an emitter of the transistor Tr4 is connected to the current source I4 through the resistor R12.

A collector of the transistor Tr5 is connected to the output port Out1, and a collector of the transistor Tr6 is connected to the output port Out2. A base of the transistor Tr5 and a base of the transistor Tr6 are connected to a node N between the resistors R13 and R14. One end of the capacitor C1 is grounded, and the other end of the capacitor C1 is connected to the node N. The resistors R13 and R14 configure a voltage divider for dividing a power supply voltage at the node N. A voltage of the node N determined by the resistors R13 and R14 sets a base bias of the transistors Tr5 and Tr6. The transistors Tr3 and Tr4 may be InP-based n-type Double Heterojunction Bipolar Transistors (InP-DHBT).

Further, one end of the resistor R15 is connected to an emitter of the transistor Tr5 and a collector of the transistor Tr3. Further, one end of resistor R16 is connected to an emitter of the transistor Tr6 and a collector of the transistor Tr4. These resistors R15 and R16 work as current sources for generating a current flowing through the emitters of the transistors Tr5 and Tr6, regardless of switching states of the transistors Tr3 and Tr4.

Figure 6:
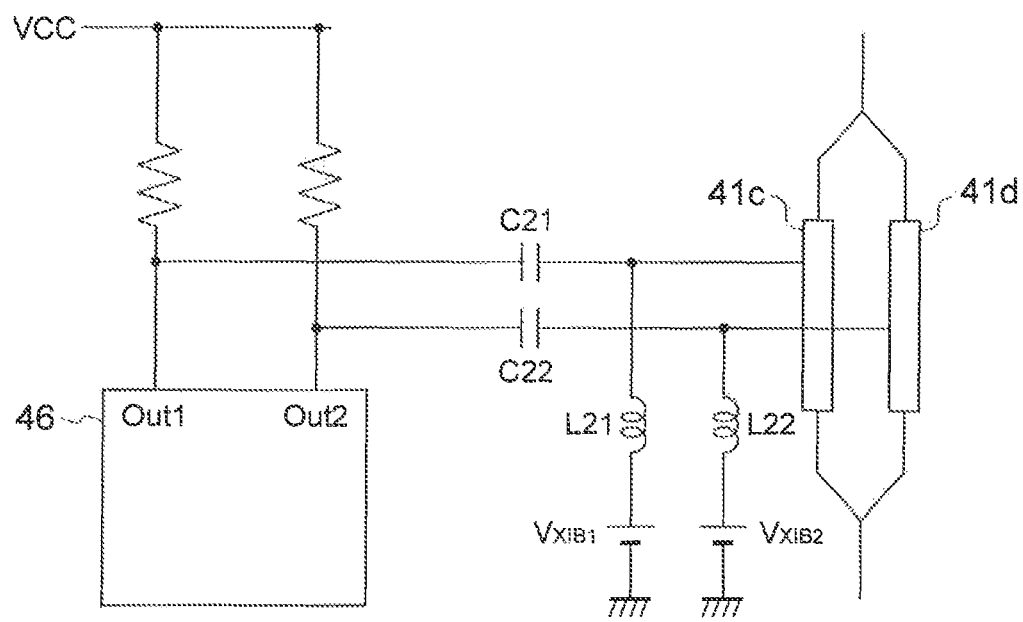
FIG. 6 is a circuit diagram illustrating an example of an electric interconnection between an output port of a driving circuit and an electrode of a multi-level modulator.

FIG. 6 illustrates an example of a related circuit between the output ports Out1 and Out2 and the electrodes 41c and 41d. As described below, the driving voltage signals from the driving circuit 46 are output to the electrodes 41c and 41d of the first QPSK modulator 4 through alternating current coupling.

The output ports Out1 and Out2 are connected to a power supply Vcc through resistors R21 and R22, respectively. That is, the driving circuit 46 has an open collector output configuration. Further, when the driving circuit 46 is configured not by a bipolar transistor but by a Metal-Oxide-Semiconductor (MOS) transistor, the driving circuit 46 may has an open drain output configuration.

Further, the output ports Out1 and Out2 are connected to the electrodes 41c and 41d through capacitors C21 and C22, respectively. The electrodes 41c and 41d are connected to the bias voltages $V_{XIB1}$ and $V_{XIB2}$ output from the bias control circuit 47 through inductors L21 and L22, respectively.

Here, the control circuit 49 decreases an amplitude of the driving voltage signal output from the driving circuit 46 by decreasing a current defined by the current source I4, of the differential circuit configured by the transistors Tr3 and Tr4 and the current source I4 of the differential amplifier 46A. The amplitude of the driving voltage signal output by the differential amplifier 46A is determined based on the current defined by the current source I4 and resistance of the resistors R21 and R22 as load resistors. Therefore, the amplitude of the driving voltage signal output by the driving circuit 46 is decreased by decreasing the current provided by the current source I4.

Figure 7:
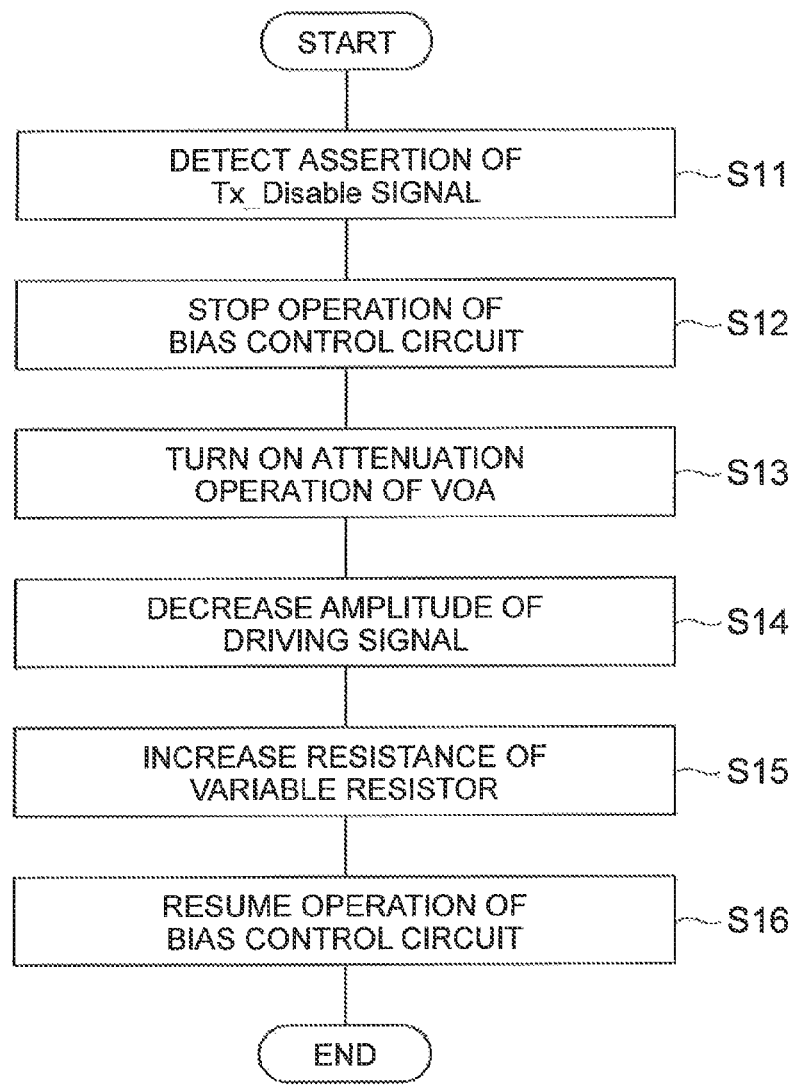
FIG. 7 is a flowchart illustrating a process in which an optical transmitter is switched from a normal operation state to a transmitter disable state.

Next, a process, in which the optical transceiver 1 according to the present embodiment is switched from the normal operation state to the transmitter disable state, will be described with reference to FIG. 7.

First, the control circuit 49 detects assertion of the Tx_Disable signal from the hose device (step S11). Next, the control circuit 49 stops an operation of the bias control circuit 47 (step S12). Next, the control circuit 49 turns on an attenuation operation of the VOA 45, and blocks an optical output from the first QPSK modulator 4 (or the second QPSK modulator 5) (step S13).

Next, the control circuit 49 decreases amplitudes of the driving voltage signals $V_{XID1}$, $V_{XID2}$, $V_{XQD1}$ and $V_{XQD2}$ output from the driving circuit 46 while blocking the optical output from the first QPSK modulator 4 (or the second QPSK modulator 5) by the VOA 45 (step S14). As described above, the amplitudes of the driving voltage signals $V_{XID1}$, $V_{XID2}$, $V_{XQD1}$ and $V_{XQD2}$ are decreased, for example, by decreasing the current provided by the current source I4 of the differential amplifier 46A.

Next, the control circuit 49 increases a resistance of the variable resistor element 48 (step S15). When the amplitudes of the driving voltage signals $V_{XID1}$, $V_{XID2}$, $V_{XQD1}$ and $V_{XQD2}$ output from the driving circuit 46 is decreased, an optical power detected by the first optical power monitor 11 is decreased, so that an optical current from the first optical power monitor 11 is decreased. However, in this way, when the resistance of the variable resistor element 48 is increased, even when the optical current is being decreased, a monitoring sensitivity for the optical power is maintained by magnifying a potential at the one end of the variable resistor element 48, so as to easily detect the optical power.

Finally, the control circuit 49 resumes the operation of the bias control circuit 47 (step S16). Then, the switch from the normal operation state to the transmitter disable state is completed.

Figure 8:
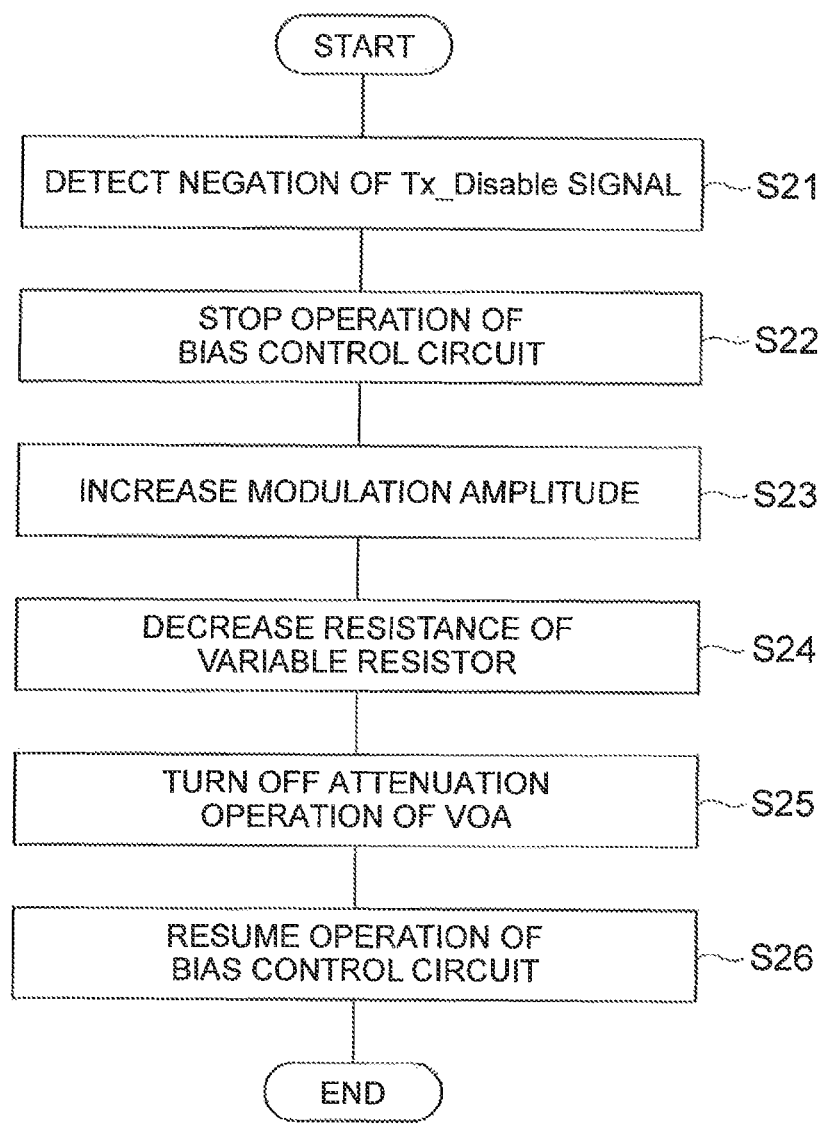
FIG. 8 is a flowchart illustrating a process in which an optical transmitter is switched from a transmitter disable state to a normal operation state.

Next, a process, in which the optical transceiver 1 according to the present embodiment is switched from the transmitter disable state to the normal operation state, will be described with reference to FIG. 8.

First, the control circuit 49 detects negation of the Tx_Disable signal from the host device (step S21). Next, the control circuit 49 stops the operation of the bias control circuit 47 (step S22). Further, the control circuit 49 increases the amplitudes of the driving voltage signals $V_{XID1}$, $V_{XID2}$, $V_{XQD1}$, and $V_{XQD2}$ output from the driving circuit 46, to values of the normal operation (step S23). As described above, the increases in the amplitudes of the driving voltage signals $V_{XID1}$, $V_{XID2}$, $V_{XQD1}$ and $V_{XQD2}$ are performed, for example, by increasing the current provided by the current source I4 of the differential amplifier 46A, to a value of the normal operation.

Next, the control circuit 49 decreases the resistance of the variable resistor element 48 (step S24). By decreasing the resistance of the variable resistor element 48, when the first QPSK modulator 4 starts the normal operation, even when the monitor current detected by the first optical power monitor 11 increases, the potential at the one end of the variable resistor element 48 is suppressed within a proper range, so that the optical power can be properly monitored.

Next, the control circuit 49 turns off the attenuation operation of the VOA 45, and passes the optical output from the first QPSK modulator 4 (or the second QPSK modulator 5) again (step S25).

Finally, the control circuit 49 resumes the operation of the bias control circuit 47 (step S26). Then, the switching from the transmitter disable state to the normal operation state is completed.

Next, a process of adjusting a phase difference between two lights passing through two optical waveguides of a Mach-Zehnder modulator, in a method of controlling the optical transceiver 1 according to the present embodiment, will be described with reference to FIG. 9. As in the optical transceiver 1 according to the present embodiment, when the first QPSK modulator 4 includes two Mach-Zehnder interference unit which are the first Mach-Zehnder interference unit 41 and the second Mach-Zehnder interference unit 42, the first Mach-Zehnder interference unit 41 and the second Mach-Zehnder interference unit 42 may adjust the bias voltages $V_{XIB1}$, $V_{XIB2}$, $V_{XQB1}$ and $V_{XQB2}$ in a time sharing system such that a phase difference between the light passing through the optical waveguide wg21a (or the optical waveguide wg22a) and the light passing through the optical waveguide wg21b (or the optical waveguide wg22b) becomes $\pi$. When the optical waveguides are configured by semiconductor optical waveguides, if a large bias voltage is applied to the optical waveguides, light may not be transferred at all. When the first Mach-Zehnder interference unit 41 adjusts the bias voltages $V_{XIB1}$ and $V_{XIB2}$, light is absorbed to the optical waveguide wg24 by applying a large negative bias voltage to the electrode 44 installed in the optical waveguide wg24 located at an output side of the second Mach-Zehnder interference unit 42. Then, when the first Mach-Zehnder interference unit 41 adjusts the bias voltages, an optical output from the second Mach-Zehnder interference unit 42 becomes approximately zero. Likewise, when the second Mach-Zehnder interference unit 42 adjusts the bias voltages $V_{XQB1}$ and $V_{XQB2}$, light is absorbed to the optical waveguide wg23 by applying a large negative bias voltage to the electrode 43 installed in the optical waveguide wg23 located at an output side of the first Mach-Zehnder interference unit 41. Then, when the second Mach-Zehnder interference unit 42 adjusts the bias voltages, an optical output from the first Mach-Zehnder interference unit 41 becomes approximate zero.

Otherwise, in another method according to the present invention, the second Mach-Zehnder interference unit 42 may maintain the normal operation state, and the first Mach-Zehnder interference unit 41 may adjust the bias voltages $V_{XIB1}$ and $V_{XIB2}$. In this case, although an optical output is provided since the second Mach-Zehnder interference unit 42 performs the normal operation, it can be considered that offset light is provided when the first Mach-Zehnder interference unit 41 performs the adjustment, so that there is no problem when a relative phase difference is found. Further, even when the first time of the adjustment of the second Mach-Zehnder interference unit 42, it can be considered that an offset light is only provided at the time of the adjustment of the second Mach-Zehnder interference unit 42. Further, a switching of the adjustment of the first and second Mach-Zehnder interference units 41 and 42 is performed earlier than drifting of a driving point, so as to avoid an influence of light output by the other interference units.

Figure 9A:
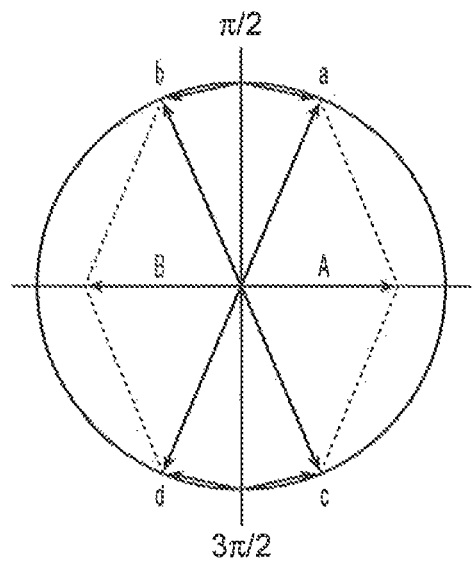
FIGS. 9A and 9B are each vector diagrams illustrating a phase of output light of a Mach-Zehnder modulator.
Figure 9B:
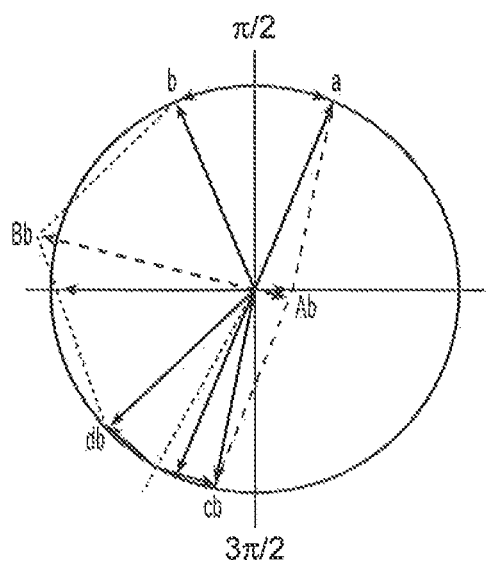

FIGS. 9A and 9B are vector diagrams schematically illustrating phases of two lights passing through the optical waveguides wg21a and wg21b. FIG. 9A illustrates a case where a phase difference between the light passing through the optical waveguide wg21a and the light passing through the optical waveguide wg21b is $\pi$, and FIG. 9B illustrates a case where the phase difference between the light passing through the optical waveguide wg21a and the light passing through the optical waveguide wg21b is not $\pi$.

Now, it may be assumed that the bias voltage $V_{XIB1}$ is applied such that the phase of the light passing through the optical waveguide wg21a becomes a phase value obtained by adding $\pi/2$ to a reference phase. At this time, the phase of the light passing through the optical waveguide wg21a vibrates around the phase value obtained by adding $\pi/2$ to the reference phase. That is, the phase of the light passing through the optical waveguide wg21a vibrates between vector a and vector b of FIG. 9A.

First, a case will be described where the light passing through the optical waveguide wg21a and the light passing through the optical waveguide wg21b is $\pi$. The phase of the light passing through the optical waveguide wg21b has a phase value obtained by adding $3\pi/2$ to the reference phase. At this time, the phase of the light passing through the optical waveguide wg21b vibrates about the phase value obtained by adding $3\pi/2$ to the reference phase. That is, the phase of the light passing through the optical waveguide wg21b vibrates between a vector c and a vector d of FIG. 9A.

Here, a vector obtained by adding vector a to vector c refers to vector A, and a vector obtained by adding vector b to vector d refers to vector B. At this time, a size of a signal detected by the first optical power monitor 11 to monitor an optical output power is a difference between a real part of vector A and a real part of vector B.

Next, a case will be described where the light passing through the optical waveguide wg21a and the light passing through the optical waveguide wg21b is not $\pi$. For convenience of description, the phase of the light passing through the optical waveguide wg21a vibrates around the phase value obtained by adding $\pi/2$ to the reference phase. At this time, a phase difference of the light passing through the optical waveguide wg21b vibrates around an angle deviating from the phase value obtained by adding $3\pi/2$ to the reference phase. As illustrated in FIG. 9B, the phase of the light passing through the optical waveguide wg21b vibrates between vector cb and vector db.

Here, a vector obtained by adding vector a to vector cb refers to vector Ab, and a vector obtained by adding vector b to vector db refers to vector Bb. At this time, a size of a signal detected by the first optical power monitor 11 to monitor an optical output power is a difference between a real part of vector Ab and a real part of vector Bb.

As can be seen by comparing FIG. 9A with FIG. 9B, a difference between a real part of vector A and a real part of vector B is larger than the difference between the real part of vector Ab and the real part of vector Bb. As described above, when the phase difference between the light passing through the optical waveguide wg21a and the light passing through the optical waveguide wg21b is $\pi$, the size of the signal detected by the first optical power monitor 11 is maximized. In other words, the control circuit 49 adjusts the phase difference between the light passing through the optical waveguide wg21a and the light passing through the optical waveguide wg21b to become π, by adequately adjusting the bias voltages $V_{XIB1}$ and $V_{XIB2}$ output from the bias control circuit 47, such that the amplitude of the signal detected by the first optical power monitor 11 is maximized.

In accordance with the aforementioned optical transceiver 1 according to the present embodiment, the amplitude of the driving signal for driving the first QPSK modulator 4 (or the second QPSK modulator 5) is decreased while blocking the optical output from the first QPSK modulator 4 (or the second QPSK modulator 5) by the VOA 45. Thus, power consumption of the driving circuit is decreased during the blocking operation by the VOA 45. At the same time, since the light input to the first optical power monitor 11 does not disappear completely, the bias control circuit 47 can continuously control the bias voltage applied to the first QPSK modulator 4 (or the second QPSK modulator 5), according to the optical output power of the first QPSK modulator 4 (or the second QPSK modulator 5). Accordingly, a bias point of the first QPSK modulator 4 (or the second QPSK modulator 5) can be adequately controlled while decreasing the power consumption of the optical transceiver 1.

Figure 10A:
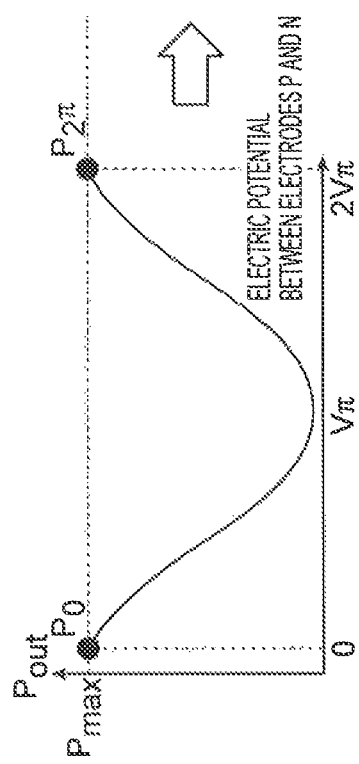
FIGS. 10A and 10B respectively illustrate an optical output power curve of a Mach-Zehnder modulator and provide a timing chart of optical power for normal operation.

Such an effect according to the present embodiment will be described with reference to FIGS. 10A to 12B. FIG. 10A is a curve illustrating a relationship between the optical power at the output unit of the first Mach-Zehnder interference unit 41 and a potential difference between the driving signals applied to the two electrodes 41c and 41d. A vertical axis thereof denotes an output power Pout, and a horizontal axis thereof denotes the potential difference between the driving voltage signals applied to the two electrodes 41c and 41d. A voltage $V_\pi$ denotes a difference value between the driving voltages where the phase difference between the light passing through the optical waveguide wg21a and the light passing through the optical waveguide wg21b becomes π.

As described with reference to FIG. 4, during an approximately half time zone of the normal operation state, the phase difference between the light passing through the optical waveguide wg21a and the light passing through the optical waveguide wg21b is 2π. This state corresponds to point $P_{2\pi}$ in FIG. 10A. During approximately another half time zone of the normal operation state, the phase difference between the light passing through the optical waveguide wg21a and the light passing through the optical waveguide wg21b is zero. This state corresponds to a point $P_0$ in FIG. 10A. At a time of switching between the two states, the electric potential difference between the driving voltage signals applied to the electrodes 41c and 41d is varied between 0 and $2V_\pi$.

In the aforementioned two states, since the phase difference between the light passing through the optical waveguide wg21a and the light passing through the optical waveguide wg21b is 2π or 0, the light passing through the optical waveguide wg21a and the light passing through the optical waveguide wg21b are strengthened with each other, so that the output light power becomes the maximum power Pout. Meanwhile, when the phase difference between the light passing through the optical waveguide wg21a and the light passing through the optical waveguide wg21b is not 2π or 0, the output light power is lower than the maximum power Pout. In particular, at a time when the potential difference between the driving voltage signals applied to the two electrodes 41c and 41d becomes Vπ, since the phase difference between the light passing through the optical waveguide wg21a and the light passing through the optical waveguide wg21b is π, the light passing through the optical waveguide wg21a and the light passing through the optical waveguide wg21b are weakened with each other, so that the output light power is decreased to theoretically become zero. The curve in FIG. 10A illustrates a relation between the potential difference between the driving voltage signals applied to the two electrodes 41c and 41d and the output power.

During most of the normal operation, the phase difference between the light passing through the optical waveguide wg21a and the light passing through the optical waveguide wg21b is zero or 2π. Thus, as illustrated by points $P_0$ and $P_{2\pi}$ in FIG. 10A, the output power is almost always Pmax, and only at a time of the switching between points $P_0$ and $P_{2\pi}$, the output light power is decreased.

Figure 10B:
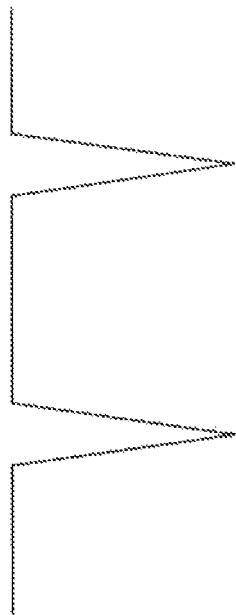
Figures 11A, 11B:
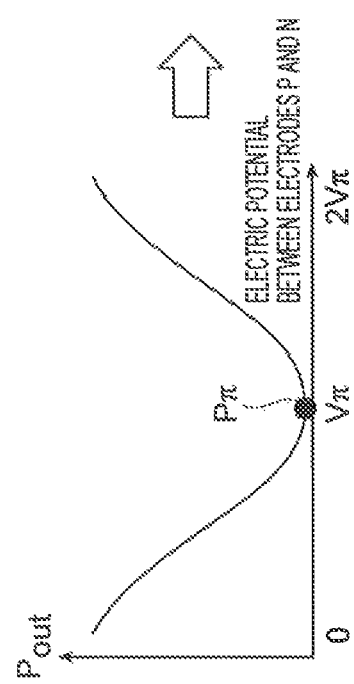
FIGS. 11A and 11B respectively illustrate an optical output power curve of Mach-Zehnder modulator and provide a timing chart of optical power while performing a transmitter disable function, in an optical transmitter according to the related art.
Figure 12B:
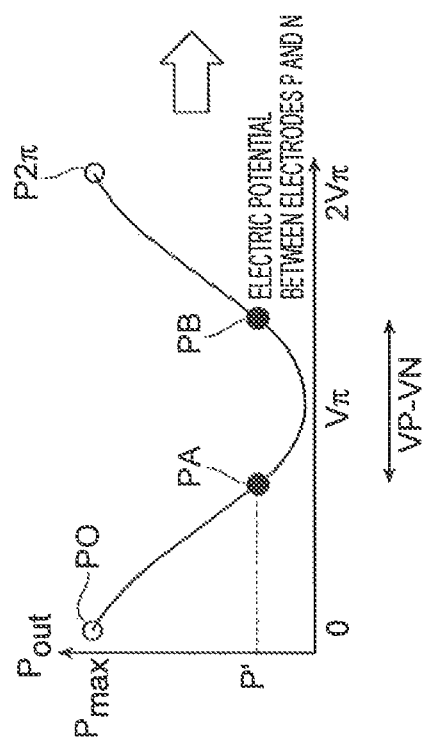
FIGS. 12A and 12B respectively illustrate an optical output power curve of a Mach-Zehnder modulator and provide a timing chart of optical power, while performing a transmitter disable function, in an optical transmitter according to the present invention.
Figure 12A:
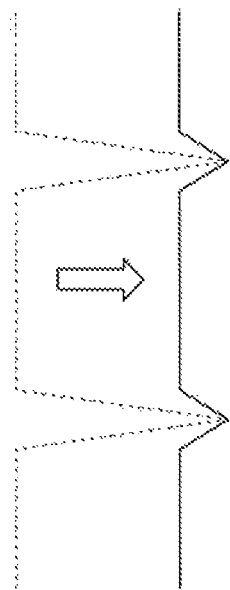

However, as described above, the electrodes 41c and 41d are biased by the bias control circuit such that the phase difference between the light passing through the optical waveguide wg21a and the light passing through the optical waveguide wg21b becomes π. Thus, when the driving circuit 46 is completely stopped, as illustrated in FIG. 11A, the potential difference between the electrodes 41c and 41d becomes $V_\pi$ which allows the phase difference between the light passing through the optical waveguide wg21a and the light passing through the optical waveguide wg21b to become π. In this state, as illustrated in FIG. 10B, the output light power becomes almost zero, so that it is difficult to detect the optical power using the first optical power monitor 11. Thus, the bias control circuit 47 cannot control the bias voltage by monitoring the output power, and operation points of the first Mach-Zehnder interference unit 41 and the second Mach-Zehnder interference unit 42 drifts.

On the other hand, in the present embodiment, even when the VOA 45 starts an operation of blocking the output light, just the reduction of the amplitudes of the driving voltage signals for driving the first QPSK modulator 4 cannot prevent the driving circuit 46 from outputting the driving signal. Thus, the first Mach-Zehnder interference unit 41 and the second Mach-Zehnder interference unit 42 operate between point $P_A$ and point $P_B$ in FIG. 12A. Accordingly, the optical power detected by the first optical power monitor 11 is lower than that of the normal operation, illustrated as a dotted line in FIG. 12B. However, the optical power detected by the first optical power monitor 11 is a value having an amplitude illustrated as a solid line in FIG. 12B. Thus, the bias control circuit 47 can continuously control the bias voltage applied to the first QPSK modulator 4 (or the second QPSK modulator 5) by monitoring the optical output power of the first QPSK modulator 4 (or the second QPSK modulator 5).

Figure 13A:
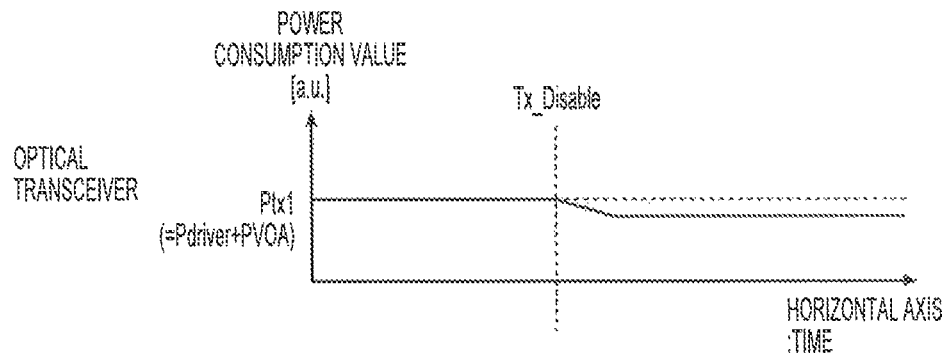
FIGS. 13A to 13D together provide a timing chart of power consumption of each component during a general operation state and a transmitter disable state according to the present embodiment.
Figure 13B:
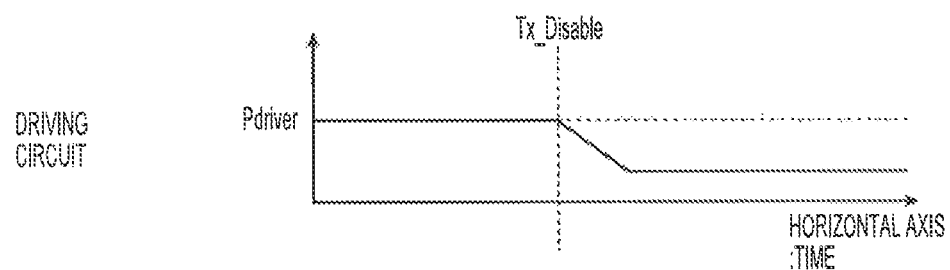
Figure 13C:
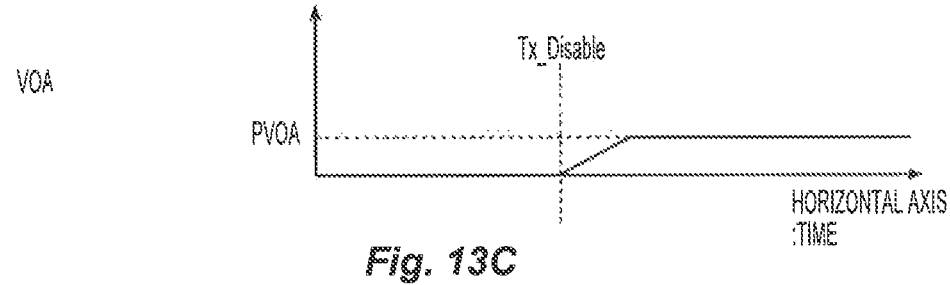
Figure 13D:
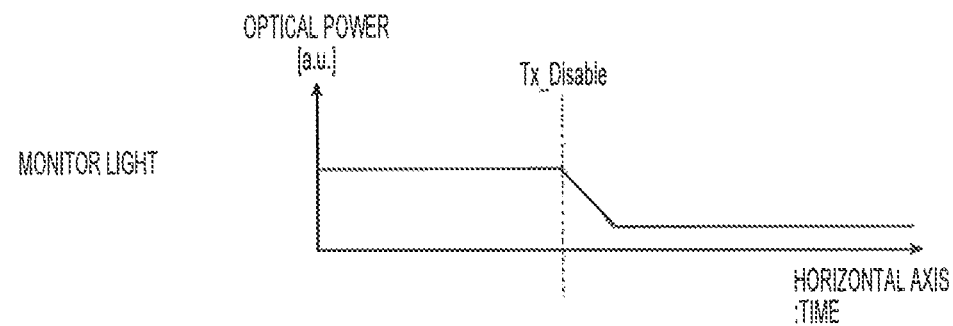

Moreover, it is possible to reduce the power consumption of the optical transceiver 1. As illustrated in FIGS. 13A to 13D, after the control circuit 49 receives the Tx_Disable signal, power consumption $P_{VOA}$ of the VOA 45 is increased as illustrated in FIG. 13C. However, as illustrated in FIG. 13B, an amount of a decrease in power consumption $P_d$, of the driving circuit 46 is larger than an amount of the increase in the power consumption $P_{VOA}$ of the VOA 45. Thus, as illustrated in FIG. 13A, power consumption $P_{tx1}$ of the optical transceiver 1 (the power consumption $P_{tx1}$ is increased and decreased equally with respect to the sum of the power consumption $P_{driver}$ of the driving circuit 46 and the power consumption $P_{VOA}$ of the VOA 45) is decreased after the Tx_Disable signal is received. Further, an optical power of the monitoring light of the first optical power monitor 11 is decreased as illustrated in FIG. 13D, by decreasing the power consumption $P_{driver}$ of the driving circuit 46 as illustrated in FIG. 13B. However, even when the optical power of the monitoring light is decreased in this way, the bias control circuit 47 can control the bias voltage according to the optical power detected thereby.

In this way, in accordance with the optical transceiver 1 according to the present embodiment, a bias point of the first QPSK modulator 4 (or the second QPSK modulator 5) can be adequately controlled while decreasing the power consumption of the optical transceiver 1.

Further, the bias voltage is adjusted such that the phase differences between two lights passing through the first optical waveguides wg21a and wg22a of the first Mach-Zehnder interference unit 41 and the second Mach-Zehnder interference unit 42 and two lights passing through the second optical waveguides wg21b and wg22 of the first Mach-Zehnder interference unit 41 and the second Mach-Zehnder interference unit 42 become π. Accordingly, the phase differences between two lights passing through the first optical waveguides wg21a and wg22a and two lights passing through the second optical waveguides wg21b and wg22b can be controlled to be a which is an adequate value when the optical transceiver returns to the normal operation state.

Further, the bias voltages of the two Mach-Zehnder interference units which are the first Mach-Zehnder interference unit 41 and the second Mach-Zehnder interference unit 42 are adjusted in a time sharing system. Accordingly, the two Mach-Zehnder interference units can use the one bias control circuit 47, the one driving circuit 46 or the one control circuit 49 together, and the downsizing and the reduction in power consumption of the optical transceiver 1 can be achieved.

Further, since the driving circuit has a differential circuit configuration, the driving voltage signals can be provided to the first QPSK modulator 4 and the second QPSK modulator 5 as a pair of complementary voltage signals. Further, since the driving voltage signals are output to the first QPSK modulator 4 and the second QPSK modulator 5 through the current switching, the bias point of the driving voltage signals can be optimized. Furthermore, the amplitudes of the driving voltage signals can be easily decreased by decreasing the current provided by the current source I4 included in the differential circuit of the driving circuit 46.

Further, the optical transceiver and the method of controlling the optical transceiver according to the present invention are not limited to the aforementioned embodiment.

Figure 14:
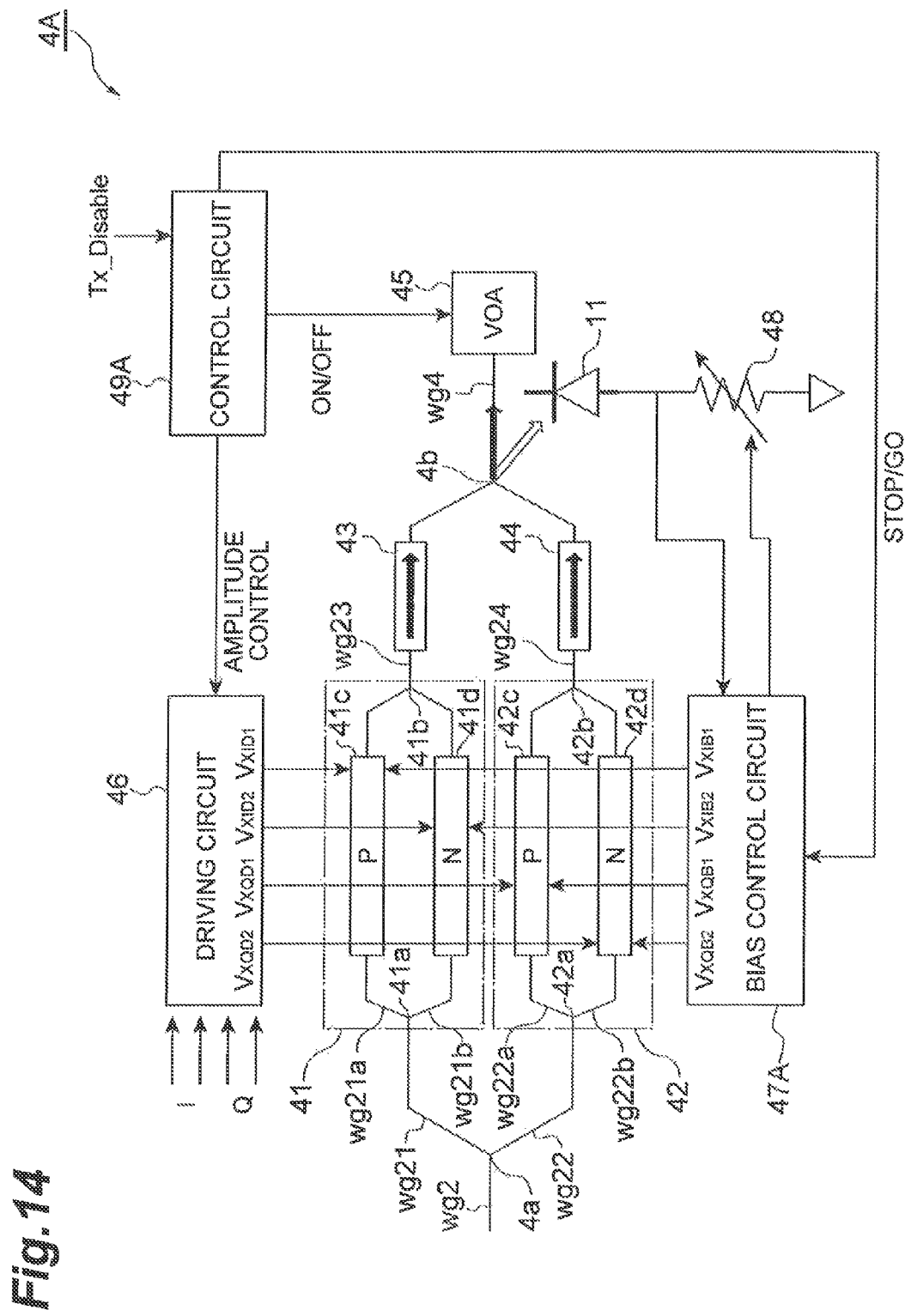
FIG. 14 illustrates a modified example of a multi-level modulator and a configuration for controlling the multi-level modulator.

For example, FIG. 14 illustrates a first QPSK modulator 4A as one modified example of the first QPSK modulator 4 illustrated in FIG. 3. A bias control circuit 47A and a control circuit 49A instead of the bias control circuit 47 and the control circuit 49 are installed in the first QPSK modulator 4A. In the first QPSK modulator 4A, the bias control circuit 47A instead of the control circuit 49A controls a resistance of the variable resistor element 48.

Figure 15:
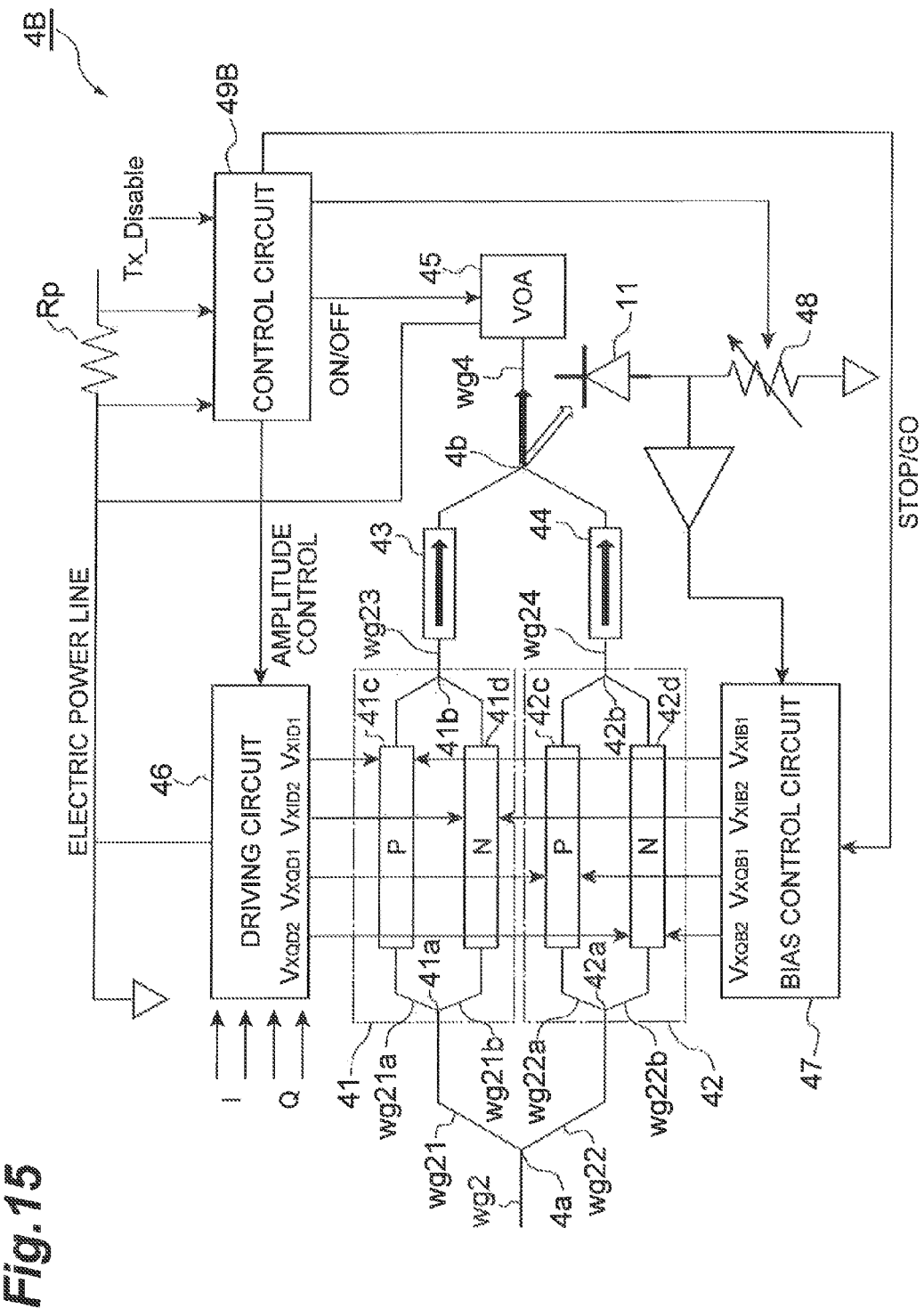
FIG. 15 illustrates another modified example of a multi-level modulator and a configuration for controlling the multi-level modulator.

Further, FIG. 15 illustrates a first QPSK modulator 4B as another modified example of the first QPSK modulator 4 illustrated in FIG. 3. A resistive element Rp for detecting a power consumption regarding an electric power line is added in the first QPSK modulator 4B. A control circuit 49B detects a voltage drop between opposite ends of the resistive element Rp to detect a power consumption generated by the VOA 45. Further, while VOA 45 blocks the output light, the control circuit 49B detects power consumption increased because of the blocking of the output light by the VOA 45. The control circuit 49B decreases the amplitudes of the driving voltage signals from the driving circuit 46 such that the power consumption of the driving circuit 46 is decreased to compensate the power consumption increased by the VOA 45.

Figure 16:
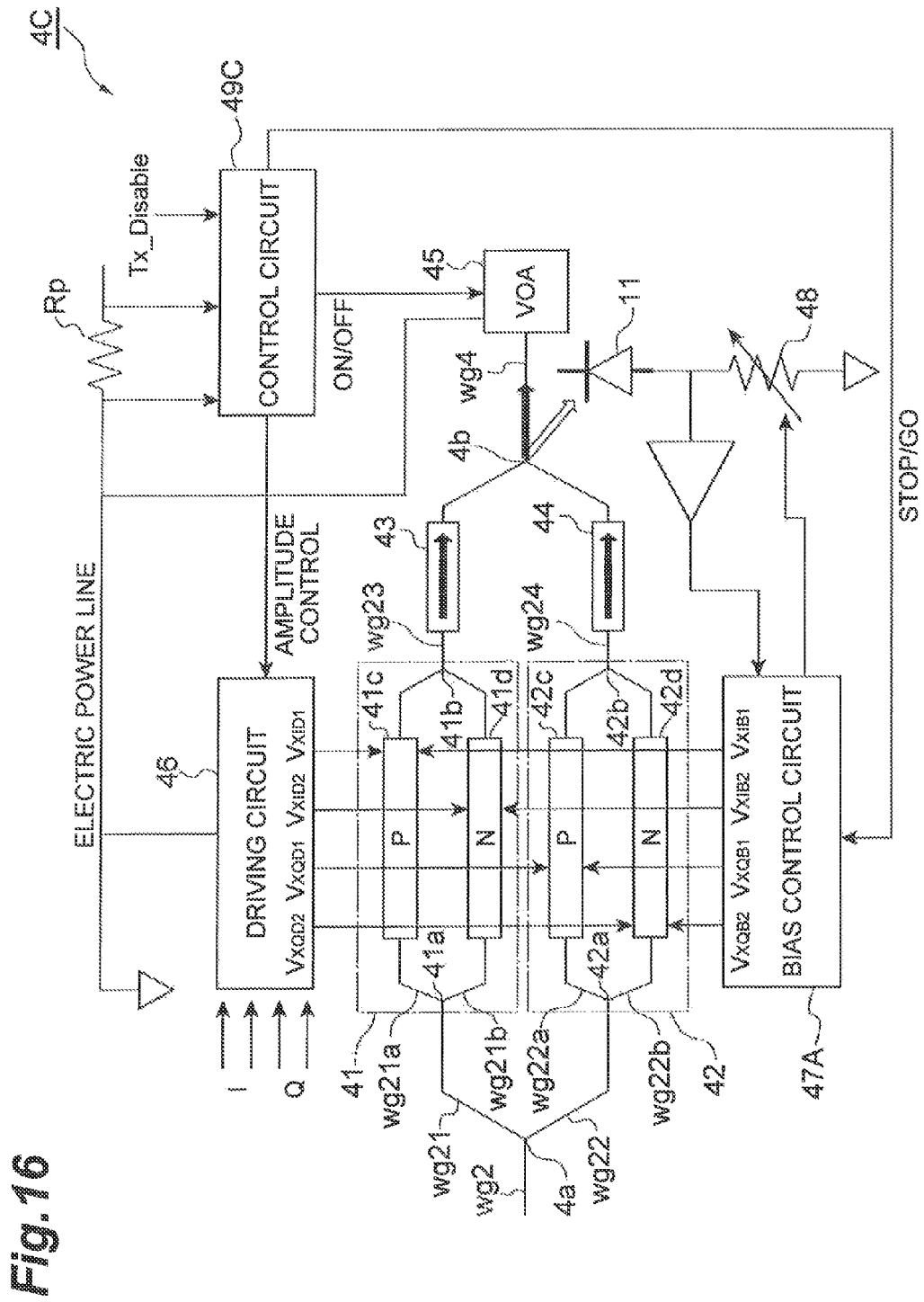
FIG. 16 illustrates yet another modified example of a multi-level modulator and a configuration for controlling the multi-level modulator.

Further, FIG. 16 illustrates a first QPSK modulator 4C as yet another modified example of the first QPSK modulator 4 illustrated in FIG. 3. The bias control circuit 47A and a control circuit 49C instead of the bias control circuit 47 and the control circuit 49 are installed in the first QPSK modulator 4C. In the first QPSK modulator 4C, the bias control circuit 47A instead of the control circuit 49C controls a resistance of the variable resistor element 48. Further, a resistive element Rp for detecting a power consumption of an electric power line is installed in the first QPSK modulator 4C. The control circuit 49C detects a voltage drop between opposite ends of the resistive element Rp to detect a power consumption generated by the VOA 45. Further, while VOA 45 blocks the output light, the control circuit 49C detects power consumption increased because of the blocking of the output light by the VOA 45. The control circuit 49C decreases the amplitudes of the driving voltage signals from the driving circuit 46 such that the power consumption of the driving circuit 46 is decreased to compensate the power consumption increased by the VOA 45.

Further, the optical transceiver may include one or more semiconductor Mach-Zehnder modulators instead of the first QPSK modulator 4 and the second QPSK modulator 5 which are described above.

What is claimed is:

1. An optical transmitter comprising:
    a light source configured to generate continuous wave light;
    a multi-level modulator configured to modulate the continuous wave light;
    an optical switch configured to block an output light output from the multi-level modulator;
    a driving circuit configured to output a driving voltage signal for driving the multi-level modulator;
    a bias control circuit configured to control a bias voltage applied to the multi-level modulator, according to an optical power of the output light; and
    a control circuit configured to control the optical switch, the driving circuit and the bias control circuit, the control circuit decreasing an amplitude of the driving voltage signal while the optical switch is blocking the output light, wherein the driving circuit
        has a differential circuit configuration including paired differential transistors, a current source, and an open collector output or an open drain output, and
        outputs the driving voltage signal to the multi-level modulator with current switching by the paired differential transistors.

2. The optical transmitter according to claim 1, wherein
    the multi-level modulator comprises two or more semiconductor Mach-Zehnder modulators,
    each semiconductor Mach-Zehnder modulator comprises a first optical waveguide and a second optical waveguide for passing two lights branching off from an input side of said each semiconductor Mach-Zehnder modulator, a first electrode formed on the first optical waveguide, and a second electrode formed on the second optical waveguide,
    the bias control circuit applies individual bias voltages to the first and second electrodes, respectively, and
    the control circuit controls the bias control circuit to adjust the bias voltages such that a phase difference between light passing through the first optical waveguide and light passing through the second optical waveguide becomes π while the optical switch is blocking the output light.

3. The optical transmitter according to claim 2, wherein
    the multi-level modulator comprises two semiconductor Mach-Zehnder modulators, and the control circuit controls the bias control circuit, with respect to each of the two semiconductor Mach-Zehnder modulators, in a time sharing system, to adjust the bias voltages such that a phase difference between light passing through the first optical waveguide and light passing through the second optical waveguide becomes $\pi$.

4. The optical transmitter according to claim 1, wherein the control circuit decreases an amplitude of the driving voltage signal output from the driving circuit, by decreasing a current provided by the current source.

5. A method of controlling an optical transmitter comprising:
   detecting an assertion of a transmitter disable signal from an external host device,
   changing an operation of a bias control circuit, the bias control circuit controlling bias voltages applied to a multi-level modulator, the multi-level modulator comprising a first optical waveguide and a second optical waveguide, the bias voltages being adjusted such that a phase difference between light passing through the first optical waveguide and light passing through the second optical waveguide becomes $\pi$,
   turning on an attenuation operation of an optical switch, the optical switch blocking an output light output from the multi-level modulator,
   decreasing an amplitude of a driving voltage signal, the driving voltage signal being applied to the multi-level modulator to modulate a continuous wave light generated by a light source,
   increasing a resistance of a variable resistor element, the variable resistor element generating a potential by a monitor current flowing through the variable resistor element, the monitor current being generated by an optical detector configured to detect an optical power of the output light, and
   resuming the operation of the bias control circuit.

6. The method according to claim 5, wherein the changing of operation of a bias control circuit comprises adjusting the bias voltages in a time sharing system such that a phase difference between light passing through the first optical waveguide and light passing through the second optical waveguide becomes $\pi$.

* * * * *